(12) United States Patent
Zhang et al.

(10) Patent No.: US 12,340,225 B1
(45) Date of Patent: Jun. 24, 2025

(54) METHOD FOR INSTRUCTION REWRITING, ELECTRONIC DEVICE, AND COMPUTER-READABLE STORAGE MEDIUM

(71) Applicant: Beijing Volcano Engine Technology Co., Ltd., Beijing (CN)

(72) Inventors: Yongquan Zhang, Beijing (CN); Zhou Li, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/958,186

(22) Filed: Nov. 25, 2024

(30) Foreign Application Priority Data

Dec. 21, 2023 (CN) .......................... 202311775054.0

(51) Int. Cl.
*G06F 9/38* (2018.01)
*G06F 9/30* (2018.01)

(52) U.S. Cl.
CPC ........ *G06F 9/3861* (2013.01); *G06F 9/30181* (2013.01)

(58) Field of Classification Search
CPC .......................... G06F 9/3861; G06F 11/3636
See application file for complete search history.

(56) References Cited

FOREIGN PATENT DOCUMENTS

| CN | 115617326 A | 1/2023 |
|----|-------------|--------|
| CN | 117194537 A | 12/2023 |

OTHER PUBLICATIONS

"LangChain on Databricks for LLM development," Databricks, Available Online at https://docs.databricks.com/en/large-language-models/langchain.html, Nov. 25, 2024, 10 pages.

*Primary Examiner* — Michael J Metzger
(74) *Attorney, Agent, or Firm* — Alleman Hall & Tuttle LLP (57) ABSTRACT

A method for instruction rewriting, an electronic device, and a computer-readable storage medium are provided. The method includes: generating a debugging instruction based on instruction description information carried in a received debugging request; acquiring a debugging running log corresponding to the debugging instruction, where the debugging running log is obtained by processing the debugging instruction; and in response to the debugging running log indicating a running exception, rewriting the debugging instruction based on exception handling information corresponding to the exception to obtain a rewritten instruction, and in response to the debugging running log indicating that running is normal, rewriting the debugging instruction based on difference description information between an expected debugging result carried in the debugging request and an actual debugging result corresponding to the debugging instruction to obtain the rewritten instruction, where the actual debugging result is obtained by processing the debugging instruction.

20 Claims, 3 Drawing Sheets

METHOD FOR INSTRUCTION REWRITING, ELECTRONIC DEVICE, AND COMPUTER-READABLE STORAGE MEDIUM

CROSS-REFERENCE TO RELATED APPLICATION

This application claims the priority to and benefits of the Chinese Patent Application, No. 202311775054.0, which was filed on Dec. 21, 2023, and is hereby incorporated by reference in its entirety.

TECHNICAL FIELD

The present application relates to the field of computer technology, and in particular, to a method for instruction rewriting, an electronic device, and a computer-readable storage medium.

BACKGROUND

For some data engines, such as Flink and Spark data engines, a task in the data engine can be used to provide a corresponding service for a user only after going through steps such as development, debugging, release, and launch.

In addition, in the debugging phase, a person needs to obtain a debugging instruction that meets the debugging requirements, such as a structured query language (SQL) statement, by means of manual rewriting and trial and error for many times, which results in a long time-consuming debugging process. The debugging instruction refers to an instruction that needs to be used to debug the task.

SUMMARY

To solve the above technical problems, the present disclosure provides a method and apparatus for instruction rewriting, an electronic device, and a computer-readable storage medium, which are beneficial to debugging efficiency.

To achieve the above objective, the technical solution provided in the present disclosure is as follows.

The present disclosure provides a method for instruction rewriting, which includes:
  after receiving a debugging request, generating a debugging instruction based on instruction description information carried in the debugging request;
  acquiring a debugging running log corresponding to the debugging instruction, where the debugging running log is obtained by processing the debugging instruction;
  in response to the debugging running log indicating a running exception, rewriting the debugging instruction based on exception handling information corresponding to the exception to obtain a rewritten instruction; and
  in response to the debugging running log indicating that running is normal, rewriting the debugging instruction based on difference description information between an expected debugging result carried in the debugging request and an actual debugging result corresponding to the debugging instruction to obtain the rewritten instruction, where the actual debugging result is obtained by processing the debugging instruction.

In a possible implementation, the rewritten instruction is obtained by rewriting the debugging instruction by using an instruction rewriting model that is pre-constructed.

In a possible implementation, the instruction rewriting model is configured to perform rewriting based on an instruction constraint corresponding to a data engine, a data source constraint corresponding to the data engine, and a rewriting constraint corresponding to the data engine, where the data engine is configured to process the debugging instruction.

In a possible implementation, a process of determining the exception handling information corresponding to the exception includes:
  in response to the debugging running log indicating the running exception, vectorizing the debugging running log to obtain a debugging log vector;
  searching, based on the debugging log vector, for a target exception representation vector from at least one candidate exception representation vector, where a similarity between the target exception representation vector and the debugging log vector is higher than a similarity between any other candidate exception representation vector except the target exception representation vector in the at least one candidate exception representation vector and the debugging log vector; and
  determining the exception handling information corresponding to the exception based on exception handling information corresponding to the target exception representation vector.

In a possible implementation, the debugging instruction is obtained by performing instruction generation on the instruction description information by using a pre-constructed instruction generation model.

In a possible implementation, after obtaining the rewritten instruction, the method further includes:
  generating response information corresponding to the debugging request based on the rewritten instruction.

In a possible implementation, the response information includes instruction adjustment prompt information, and the instruction adjustment prompt information is determined based on difference description information between the rewritten instruction and the debugging instruction.

In a possible implementation, in response to the debugging running log indicating that running is normal, the response information is generated based on the rewritten instruction and the actual debugging result.

In a possible implementation, the response information includes difference description information between the expected debugging result and the actual debugging result.

In a possible implementation, the response information is generated by using a packaging model that is pre-constructed, and the packaging model is configured to perform readability packaging on input data of the packaging model.

In a possible implementation, after the generating response information corresponding to the debugging request, the method further includes:
  displaying the response information;
  in response to receiving an instruction use request, determining the rewritten instruction as the debugging instruction; and
  in response to receiving an instruction adjustment request, updating the debugging instruction based on instruction adjustment description information carried in the instruction adjustment request.

The present disclosure provides an apparatus for instruction rewriting, which includes:

an instruction generation unit configured to, after receiving a debugging request, generate a debugging instruction based on instruction description information carried in the debugging request;

a log acquisition unit configured to acquire a debugging running log corresponding to the debugging instruction, where the debugging running log is obtained by processing the debugging instruction;

a first rewriting unit configured to, in response to the debugging running log indicating a running exception, rewrite the debugging instruction based on exception handling information corresponding to the exception to obtain a rewritten instruction; and a second rewriting unit configured to, in response to the debugging running log indicating that running is normal, rewrite the debugging instruction based on difference description information between an expected debugging result carried in the debugging request and an actual debugging result corresponding to the debugging instruction to obtain a rewritten instruction, where the actual debugging result is obtained by processing the debugging instruction.

The present disclosure provides an electronic device, including: at least one processor and at least one memory, where the at least one memory is configured to store instructions or computer programs; and the at least one processor is configured to execute the instructions or the computer programs in the at least one memory, to enable the electronic device to perform the method for instruction rewriting provided in the present disclosure.

The present disclosure provides a non-transitory computer-readable storage medium, where the non-transitory computer-readable storage medium stores instructions or computer programs that, upon running on a device, cause the device to perform the method for instruction rewriting provided in the present disclosure.

The present disclosure provides a computer program product, including computer programs carried on a non-transitory computer-readable medium, where the computer programs include program code for performing the method for instruction rewriting provided in the present disclosure.

BRIEF DESCRIPTION OF DRAWINGS

In order to more clearly describe the technical solutions in the embodiments of the present disclosure or the related art, the accompanying drawings for describing the embodiments or the related art will be briefly described below. It is clear that the accompanying drawings in the following description show merely some embodiments of the present disclosure, and a person of ordinary skill in the art may still derive other drawings from these accompanying drawings without creative efforts.

DETAILED DESCRIPTION

In order to enable those skilled in the art to better understand the solutions of the present disclosure, the following clearly and completely describes the technical solutions in the embodiments of the present disclosure with reference to the accompanying drawings in the embodiments of the present disclosure. Clearly, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
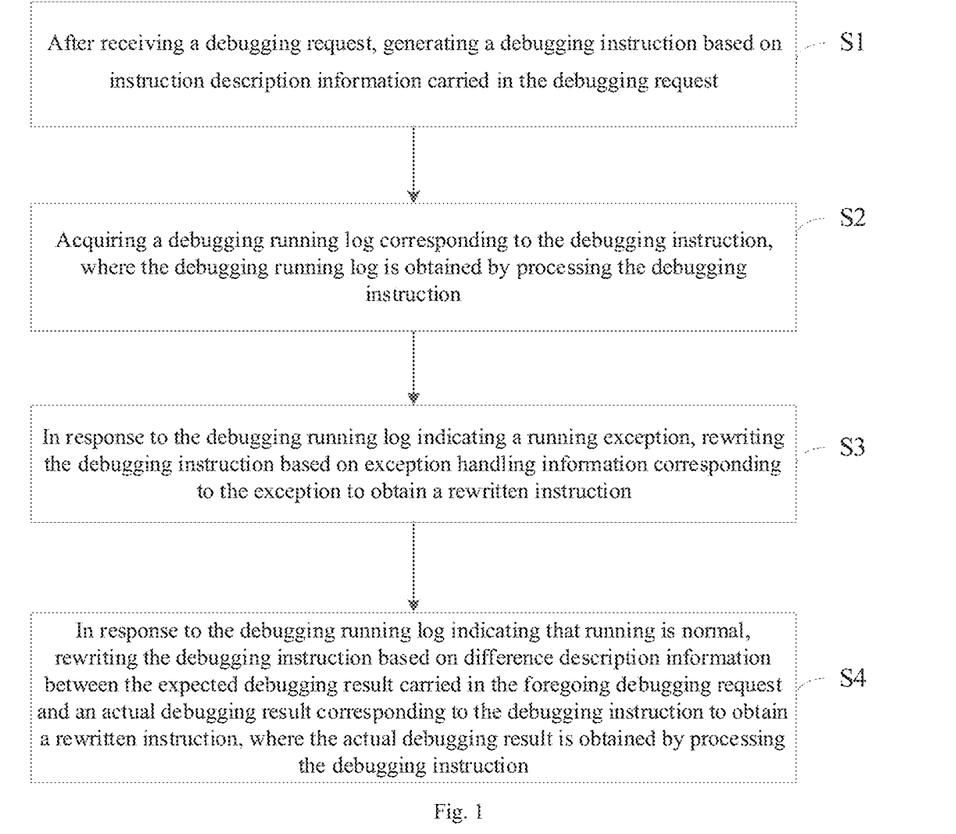
FIG. 1 is a flowchart of a method for instruction rewriting according to an embodiment of the present disclosure.

In order to better understand the technical solution provided in the present disclosure, the method for instruction rewriting provided in the present disclosure is first described below with reference to some accompanying drawings. As shown in FIG. 1, the method for instruction rewriting provided in this embodiment of the present disclosure includes the following S1 to S4. FIG. 1 is a flowchart of a method for instruction rewriting according to an embodiment of the present disclosure.

S1: After receiving a debugging request, generating a debugging instruction based on instruction description information carried in the debugging request.

The debugging request refers to a request that needs to be triggered when a task in a data engine is debugged. For example, the debugging request may be implemented by using a debugging request shown in FIG. 2.

It should be noted that the present disclosure does not limit an implementation of the data engine. For example, the data engine may be implemented by using any existing or future data engine, such as a stream computing engine similar to Flink or a data analysis engine similar to Spark.

In addition, for the foregoing debugging request, the debugging request may carry the instruction description information and an expected debugging result, so that the debugging request can describe not only an instruction that needs to be used to debug a task in a data engine, but also a result expected by a user to be obtained through debugging based on the instruction.

The instruction description information is used to describe an instruction that needs to be used to debug a task in a data engine. The present disclosure does not limit an implementation of the instruction description information. For example, the instruction description information may include at least one of an input instruction and instruction description text. The input instruction refers to an instruction manually written by a user for the task in the data engine. The present disclosure does not limit the input instruction. For example, when the data engine is Flink, the input instruction may be a Flink SQL statement manually entered by the user. The instruction description text is used to describe, in a text form, what an instruction that needs to be used to debug the task in the data engine is or what features the instruction has, so that the instruction description text can describe an instruction requirement specified by the user. The present disclosure does not limit an implementation of the instruction description text. For example, the instruction description text may be implemented by using prompt text manually written by the user.

The expected debugging result is used to describe a result expected to be obtained through debugging based on the instruction described by the instruction description information. The present disclosure does not limit an implementation of the expected debugging result.

In addition, the present disclosure does not limit a trigger manner of the foregoing debugging request. For example, the trigger manner of the debugging request may be implemented by using any existing or future request trigger method. For another example, in some application scenarios, the user may trigger the debugging request by using an interactive service module shown in FIG. 2. The interactive service module is configured to provide a human-computer interaction service for the user. The present disclosure does not limit an implementation of the interactive service module. For example, the interactive service module may be implemented by using an orchestrator. The orchestrator is configured to distribute a request and feed back a response result to the user.

The debugging instruction refers to an instruction generated based on the instruction description information carried in the foregoing debugging request, for example, an instruction such as an SQL statement. The present disclosure does not limit a generation process of the debugging instruction. For example, in some application scenarios, to better improve an instruction generation effect, the debugging instruction may be obtained by performing instruction generation on the instruction description information by using a pre-constructed instruction generation model. The instruction generation model is configured to perform instruction generation on input data of the instruction generation model. The present disclosure does not limit an implementation of the instruction generation model. For example, the instruction generation model may be implemented by using any existing or future model that can implement instruction generation, for example, a large language model (LLM). For another example, the instruction generation model may be implemented by using an instruction generation model shown in FIG. 2. In addition, the present disclosure does not limit a construction process of the instruction generation model.

It can be learned from the foregoing related content of S1 that in some application scenarios, for a task in the data engine that needs to be debugged, for example, a streaming task in Flink, in a debugging phase of the task, in response to detecting a debugging request triggered by a user, the instruction description information carried in the debugging request may be processed by using the pre-constructed instruction generation model, to obtain and output a debugging instruction, so that the data engine processes the debugging instruction later, to obtain related processing information of the debugging instruction.

S2: acquiring a debugging running log corresponding to the debugging instruction, where the debugging running log is obtained by processing the debugging instruction.

The debugging running log is used to describe a log generated when debugging is performed based on the foregoing debugging instruction, so that the debugging running log can describe a state presented when the debugging instruction is processed. It can be learned that in a possible implementation, the debugging running log may be obtained by processing the debugging instruction, so that the debugging running log can describe a state presented when the debugging instruction is processed.

In addition, in some application scenarios, the foregoing debugging instruction may be processed by using the data engine. Based on this, the present disclosure further provides a possible implementation of the foregoing debugging running log. In this implementation, the debugging running log may be obtained by the data engine processing the debugging instruction, so that the debugging running log can describe a log generated when debugging is performed by the data engine based on the debugging instruction, so that the debugging running log can indicate a running state presented when the data engine processes the debugging instruction.

It can be learned from the foregoing related content of S2 that for some application scenarios, after the debugging instruction is generated by using the foregoing instruction generation model, debugging may be performed by the data engine based on the debugging instruction, to obtain a debugging running log, so that the debugging running log can indicate a running state presented when the data engine processes the debugging instruction.

S3: in response to the debugging running log indicating a running exception, rewriting the debugging instruction based on exception handling information corresponding to the exception to obtain a rewritten instruction.

The running exception indicates that an exception error occurs during processing of the foregoing debugging instruction. The present disclosure does not limit a determination process of running exception. For example, the determination process specifically may be: in response to the existence of an exception error record in the foregoing debugging running log, it may be determined that a running exception occurs when the debugging instruction is processed, so that it may be determined that a processing process of the debugging instruction is interrupted due to the exception, and it may be further determined that a processing result of the debugging instruction cannot be obtained.

In addition, the exception handling information corresponding to the foregoing exception is used to describe how to solve the problem of the running exception described by the foregoing debugging running log. The present disclosure does not limit an acquiring process of the exception handling information.

In addition, to better improve an effect of acquiring an exception solution, the present disclosure further provides a possible implementation of a process of determining the exception handling information corresponding to the foregoing exception, which specifically may include the following steps 11 to 13.

Step 11: in response to the debugging running log indicating the running exception, vectorizing the debugging running log to obtain a debugging log vector.

The debugging log vector refers to a result obtained by vectorizing the foregoing debugging running log, so that the debugging log vector can represent features of the running exception described by the debugging running log.

In addition, in some application scenarios, to improve efficiency of determining an exception solution, the present disclosure further provides a possible implementation of the foregoing step 11. In this implementation, the step 11 specifically may be: in response to the debugging running log indicating the running exception, vectorizing an exception error record in the debugging running log to obtain a debugging log vector, so that the debugging log vector is used to represent features of an exception described by the exception error record, which is beneficial to reducing an amount of information carried in the debugging log vector, thereby reducing time consumption of subsequent vector search. The exception error record is used to describe the running exception.

Step 12: searching for a target exception representation vector from at least one candidate exception representation vector based on the foregoing debugging log vector, where a similarity between the target exception representation vector and the debugging log vector is higher than a similarity between any other candidate exception representation vector except the target exception representation vector in the at least one candidate exception representation vector and the debugging log vector.

An nth candidate exception representation vector is used to represent features of an nth candidate exception provided in advance. n is a positive integer, n°N, N is a positive integer, and N represents a quantity of vectors in the foregoing at least one candidate exception representation vector.

In addition, the present disclosure does not limit a manner of acquiring the foregoing at least one candidate exception representation vector. For example, the manner specifically may be: first searching for some exception description information and exception handling information corresponding to each piece of exception description information from a pre-constructed corpus; then vectorizing each piece of searched exception description information to obtain the at least one candidate exception representation vector, so that the at least one candidate exception representation vector includes vectorization results of the searched exception description information; and finally determining exception handling information corresponding to each candidate exception representation vector from the exception handling information corresponding to the searched exception description information, so that a solution to any exception can be quickly found based on the candidate exception representation vectors and the corresponding exception handling information later. The corpus is configured to describe related content of the foregoing data engine. The present disclosure does not limit the corpus. For example, the corpus may include a plurality of exception providing information bases, for example, an information base 1 to an information base 4 shown in FIG. 2, so that the corpus can cover various exception-related information as much as possible. For any exception providing information base, the exception providing information base may be configured to provide at least one piece of exception-related information.

Figure 2:
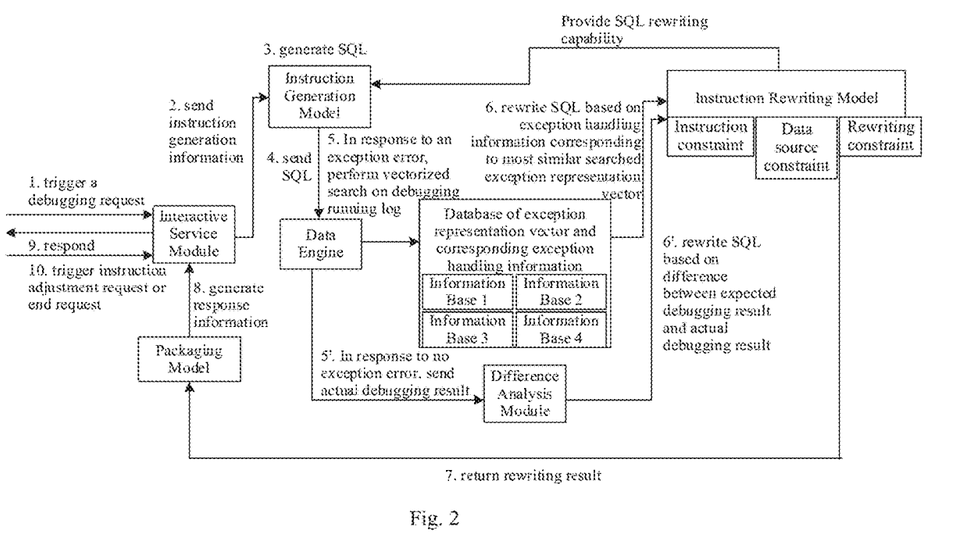
FIG. 2 is a schematic diagram of a debugging process according to an embodiment of the present disclosure.

It should be noted that for the information base 1 to the information base 4 shown in FIG. 2, the present disclosure does not limit implementations of the four information bases. For example, the information base 1 may be implemented by using a pre-constructed question answering document, and the question answering document may be at least configured to record some common exception error-related knowledge. The information base 2 may be implemented by using an open-source document pre-constructed for the data engine. The information base 3 may be implemented by using a code base pre-constructed for the data engine, and the code base may be at least configured to record some source code error information. The information base may be implemented by using some pre-constructed code bases associated with the data engine, and the code bases may be at least configured to record some source code error information associated with the data engine.

It should be further noted that for any piece of exception description information searched from the pre-constructed corpus, the exception description information is used to describe features of an exception, and the exception handling information corresponding to the exception description information is used to describe how to solve the exception described by the exception description information.

The target exception representation vector refers to a candidate exception representation vector that is most similar to the foregoing debugging log vector and that is found from the foregoing at least one candidate exception representation vector. It can be learned that a similarity between the target exception representation vector and the debugging log vector is higher than a similarity between any other candidate exception representation vector except the target exception representation vector in the at least one candidate exception representation vector and the debugging log vector. It should be noted that the present disclosure does not limit a calculation manner of the similarity. For example, the calculation manner may be implemented by using any existing or future method that can calculate a similarity between two vectors, for example, a Euclidean distance or a pre-constructed model with a similarity calculation function.

Step 13: determining the exception handling information corresponding to the foregoing exception based on exception handling information corresponding to the foregoing target exception representation vector.

It should be noted that the present disclosure does not limit an implementation of the foregoing step 13. For example, the implementation specifically may be: directly determining the exception handling information corresponding to the foregoing target exception representation vector as the exception handling information corresponding to the foregoing exception.

It can be learned from the foregoing related content of step 11 to step 13 that for some application scenarios, in response to the foregoing debugging running log indicating the running exception, vectorized search may be performed on the debugging running log by using a pre-constructed database, for example, a database shown in FIG. 2, to obtain exception handling information corresponding to the exception, so that the debugging instruction can be rewritten later based on the exception handling information corresponding to the exception, to obtain a rewritten instruction, so that the running exception does not occur when debugging is performed based on the rewritten instruction. The database is configured to record some candidate exception representation vectors and exception handling information corresponding to each candidate exception representation vector, so that the database can describe various exception problems and corresponding solutions as much as possible.

The foregoing rewritten instruction refers to a result of rewriting the foregoing debugging instruction. The present disclosure does not limit a determination process of the rewritten instruction. For example, the determination process specifically may include: in response to the debugging running log corresponding to the foregoing debugging instruction indicating a running exception, rewriting the debugging instruction based on exception handling information corresponding to the exception to obtain a rewritten instruction, so that an exception problem overcome by the exception handling information does not occur when debugging is performed based on the rewritten instruction.

In addition, in some application scenarios, to better improve an instruction rewriting effect, the present disclosure further provides a possible implementation of the foregoing S3. In this implementation, the S3 specifically may be: in response to the debugging running log corresponding to the foregoing debugging instruction indicating the running exception, rewriting the debugging instruction based on the expected debugging result carried in the foregoing debugging request and the exception handling information corresponding to the exception to obtain a rewritten instruction, so that an exception problem overcome by the exception handling information does not occur when debugging is performed based on the rewritten instruction, and a result obtained by performing debugging based on the rewritten instruction is as close to the expected debugging result as possible, for example, the result obtained by performing debugging based on the rewritten instruction is consistent with the expected debugging result.

In addition, in some application scenarios, to better improve the rewriting effect, the present disclosure further provides a possible implementation of a process of acquiring the foregoing rewritten instruction. In this implementation, the rewritten instruction may be obtained by rewriting the foregoing debugging instruction by using a pre-constructed instruction rewriting model. It can be learned that in a possible implementation, the foregoing S3 specifically may be: in response to the debugging running log corresponding to the foregoing debugging instruction indicating a running exception, inputting the exception handling information corresponding to the exception into the instruction rewriting model, so that the instruction rewriting model can rewrite the debugging instruction based on the exception handling information, to obtain and output the rewritten instruction, so that an exception problem overcome by the exception handling information does not occur when debugging is performed based on the rewritten instruction. In another possible implementation, the S3 specifically may be: in response to the debugging running log corresponding to the foregoing debugging instruction indicates a running exception, inputting the expected debugging result carried in the foregoing debugging request and the exception handling information corresponding to the exception into the instruction rewriting model, so that the instruction rewriting model can rewrite the debugging instruction based on the expected debugging result and the exception handling information, to obtain and output the rewritten instruction, so that an exception problem overcome by the exception handling information does not occur when debugging is performed based on the rewritten instruction, and a result obtained by performing debugging based on the rewritten instruction is as close to the expected debugging result as possible, for example, the result obtained by performing debugging based on the rewritten instruction is consistent with the expected debugging result.

The foregoing instruction rewriting model is configured to perform instruction rewriting on input data of the instruction rewriting model. The present disclosure does not limit an implementation of the instruction rewriting model. For example, the implementation may be implemented by using any existing or future model that can perform instruction rewriting, for example, an LLM model. For another example, the instruction rewriting model may be implemented by using an instruction rewriting model shown in FIG. 2.

In addition, to better improve the instruction rewriting effect, the present disclosure further provides a possible implementation of the foregoing instruction rewriting model. In this implementation, when the foregoing debugging instruction is processed by using a data engine, the instruction rewriting model may be configured to perform rewriting based on an instruction constraint corresponding to the data engine, a data source constraint corresponding to the data engine, and a rewriting constraint corresponding to the data engine, so that the rewritten instruction output by the instruction rewriting model can meet the instruction constraint, the data source constraint, and the rewriting constraint, which is beneficial to improving the instruction rewriting effect. The instruction constraint is used to describe features of an instruction processed by the data engine. The present disclosure does not limit an implementation of the instruction constraint. For example, the instruction constraint may be implemented by using an instruction parsing service of the data engine, for example, Flink SQL parser, so that the instruction rewriting model can modify an instruction expression and the like based on the instruction constraint. The data source constraint is used to describe features of data description information that appears in the instruction processed by the data engine. The present disclosure does not limit an implementation of the data source constraint. For example, the data source constraint may be implemented by using a catalog server, so that the instruction rewriting model can modify data description such as a data source name, a database name, and a table name based on the data source constraint. The rewriting constraint is used to describe some instruction rewriting rules pre-configured for the data engine. The present disclosure does not limit an implementation of the rewriting constraint. For example, the rewriting constraint may be implemented by using a rewriting service pre-constructed for the data engine, for example, Flink rewrite server, so that the instruction rewriting model can determine a rule that needs to be noted during instruction rewriting based on the rewriting constraint.

It should be noted that to better improve the rewriting effect, the foregoing instruction rewriting model may alternatively be configured to perform field missing repair and/or spelling error repair.

It can be learned from the foregoing related content of S3 that for some application scenarios, after the debugging running log corresponding to the foregoing debugging instruction is obtained, in response to the debugging running log indicating a running exception, the debugging instruction is rewritten based on a pre-constructed instruction rewriting model and exception handling information corresponding to the exception to obtain a rewritten instruction, so that an exception problem overcome by the exception handling information does not occur when debugging is performed based on the rewritten instruction.

S4: in response to the debugging running log indicating that running is normal, rewriting the debugging instruction based on difference description information between the expected debugging result carried in the foregoing debugging request and an actual debugging result corresponding to the debugging instruction to obtain a rewritten instruction, where the actual debugging result is obtained by processing the debugging instruction.

Running is normal indicates that no exception error occurs during processing of the foregoing debugging instruction. The present disclosure does not limit a determination process of running is normal. For example, the determination process specifically may be: in response to an absence of an exception error record in the foregoing debugging running log, it may be determined that no exception occurs when the debugging instruction is processed, so that it may be determined that a processing process of the debugging instruction is not interrupted, and it may be further determined that a processing result of the debugging instruction can be obtained, that is, the actual debugging result corresponding to the debugging instruction.

For the actual debugging result corresponding to the foregoing debugging instruction, the actual debugging result refers to a result obtained by performing debugging based on the debugging instruction, so that the actual debugging result can represent a processing result obtained by processing the debugging instruction. It can be learned that in a possible implementation, the actual debugging result may be obtained by processing the debugging instruction, so that the actual debugging result can describe a processing result of the debugging instruction.

In addition, in a possible implementation, the foregoing actual debugging result may be obtained by the data engine processing the debugging instruction, so that the actual debugging result can represent a debugging running result obtained by the data engine performing debugging based on the debugging instruction, so that the actual debugging result can represent a result obtained by the data engine processing the debugging instruction.

In addition, for the actual debugging result corresponding to the foregoing debugging instruction, the difference description information between the expected debugging result carried in the foregoing debugging request and the actual debugging result corresponding to the foregoing debugging instruction is used to describe a difference between the expected debugging result and the actual debugging result. The present disclosure does not limit an implementation of the difference description information.

In addition, the present disclosure does not limit a manner of acquiring the difference description information in the foregoing paragraph. For example, the manner may be implemented by using any existing or future difference determination method. For another example, the difference description information may be determined by using a difference analysis module shown in FIG. 2. The difference analysis module is configured to analyze a difference between two pieces of data. The present disclosure does not limit an implementation of the difference analysis module. For example, the difference analysis module may be implemented by using a pre-constructed difference analysis model.

In addition, the present disclosure does not limit an implementation of the foregoing S4. For example, the implementation specifically may be: in response to the debugging running log corresponding to the foregoing debugging instruction indicating that running is normal, rewriting the debugging instruction based on difference description information between the expected debugging result carried in the foregoing debugging request and the actual debugging result corresponding to the debugging instruction to obtain a rewritten instruction, so that a result obtained by performing debugging based on the rewritten instruction is as close to the expected debugging result as possible, for example, the result obtained by performing debugging based on the rewritten instruction is consistent with the expected debugging result.

In fact, in some application scenarios, to better improve the rewriting effect, the present disclosure further provides a possible implementation of the foregoing S4. In this implementation, the S4 specifically may be: in response to the debugging running log corresponding to the foregoing debugging instruction indicating that running is normal, first acquiring the difference description information between the expected debugging result carried in the foregoing debugging request and the actual debugging result corresponding to the debugging instruction; and then inputting the difference description information into a pre-constructed instruction rewriting model, so that the instruction rewriting model can rewrite the debugging instruction based on the difference description information, to obtain and output a rewritten instruction. It should be noted that an implementation of the instruction rewriting model is similar to an implementation of the instruction rewriting model involved in S3 described above. For example, the instruction rewriting model may be at least configured to perform field missing repair and the like based on the expected debugging result and the actual debugging result.

It can be learned from the foregoing related content of S1 to S4 that for the method for instruction rewriting provided in this embodiment of the present disclosure, after receiving a debugging request, a debugging instruction is first generated based on instruction description information carried in the debugging request, so that the debugging instruction meets an instruction requirement described by the instruction description information. Then, a debugging running log corresponding to the debugging instruction is acquired, and the debugging running log is obtained by processing the debugging instruction, so that the debugging running log can describe a state presented when the debugging instruction is processed. In response to the debugging running log indicating a running exception, the debugging instruction is rewritten based on exception handling information corresponding to the exception to obtain a rewritten instruction, so that the exception does not occur when the rewritten instruction is processed. However, in response to the debugging running log indicating that running is normal, the debugging instruction is rewritten based on difference description information between an expected debugging result carried in the debugging request and an actual debugging result corresponding to the debugging instruction to obtain a rewritten instruction, so that a result obtained by processing the rewritten instruction is consistent with the expected debugging result as much as possible. In this way, the instruction can be rewritten automatically, so that defects caused by rewriting the instruction manually, such as a long time-consuming and a large number of rewritings, can be effectively overcome, thereby improving debugging efficiency.

In addition, the present disclosure does not limit an execution subject of the method for instruction rewriting provided in this embodiment of the present disclosure. For example, the method for instruction rewriting provided in this embodiment of the present disclosure may be applied to a terminal device or a server. For another example, the method for instruction rewriting provided in this embodiment of the present disclosure may alternatively be implemented by means of data exchange between the terminal device and the server. The terminal device may be a smart phone, a computer, a personal digital assistant (PDA), a tablet computer, or the like. The server may be an independent server, a cluster server, or a cloud server.

In addition, to better improve a debugging experience, the present disclosure further provides a possible implementation of the foregoing method for instruction rewriting. In this implementation, the method for instruction rewriting not only includes the foregoing S1 to S4, but may further include the following step 21. An execution time of the step 21 is later than an execution time of the foregoing S3 or an execution time of the foregoing S4.

Step 21: generating response information corresponding to the foregoing debugging request based on the foregoing rewritten instruction.

The response information is used to describe response content determined for the foregoing debugging request. For example, the response information may be implemented by using response information shown in FIG. 2.

In addition, the present disclosure does not limit an implementation of the foregoing response information. For example, the response information may include at least the foregoing rewritten instruction, so that the user can learn the rewritten instruction from the response information.

In addition, in some application scenarios, to better improve the debugging experience, the present disclosure further provides a possible implementation of the foregoing response information. In this implementation, the response information may include at least instruction adjustment prompt information, so that the user can learn, from the response information, how to optimize the instruction description information provided by the user. The instruction adjustment prompt information is used to describe some optimization suggestions for the instruction description information carried in the foregoing debugging request. The instruction adjustment prompt information may be determined based on difference description information between the foregoing rewritten instruction and the foregoing debugging instruction, so that the instruction adjustment prompt information can convey the difference description information and the optimization suggestions corresponding to the difference description information to the user, so that the user can quickly learn some content related to instruction optimization from the instruction adjustment prompt information.

In addition, in some application scenarios, to better improve the debugging experience, the present disclosure further provides a possible implementation of the foregoing response information. In this implementation, in response to the debugging running log corresponding to the foregoing debugging instruction indicating that running is normal, the response information is generated based on the foregoing rewritten instruction and the actual debugging result corresponding to the debugging instruction, so that the user can directly learn or indirectly analyze the rewritten instruction and the actual debugging result from the response information.

In addition, the present disclosure does not limit an implementation of the response information in the foregoing paragraph. For example, in some application scenarios, to better improve the debugging experience, the response information may include at least the difference description information between the foregoing expected debugging result and the foregoing actual debugging result, so that the user can learn, from the response information, a difference between the expected debugging result and the actual debugging result. In this way, the user can indirectly analyze the actual debugging result from the response information, which is beneficial to improving the richness of the response information, thereby improving the debugging experience.

In fact, in some application scenarios, to better improve the debugging experience, the present disclosure provides a possible implementation of the foregoing response information. In this implementation, the response information is generated by using a pre-constructed packaging model. The packaging model is configured to perform readability packaging on input data of the packaging model, so that readability of the response information output by the packaging model is relatively high, and the user can better learn some related content of a current-round debugging from the response information. In this way, defects caused by relatively poor readability of the debugging running log and the actual debugging result can be effectively avoided, thereby improving the debugging experience of the user.

It can be learned from the foregoing related content of step 21 that in some application scenarios, after the foregoing rewritten instruction is obtained, the response information corresponding to the foregoing debugging request may be generated based on the rewritten instruction, so that the response information can better convey some related content of a current-round debugging process to the user, and the user can better adjust the instruction based on the response information. In this way, defects caused by the user analyzing the debugging running log, the actual debugging result, and the like by himself/herself, for example, defects such as a long time-consuming for analysis and a high probability of analysis errors, can be effectively avoided, thereby improving the debugging experience of the user.

In fact, in some application scenarios, to better improve an instruction debugging effect, the present disclosure further provides a possible implementation of the foregoing method for instruction rewriting. In this implementation, the method for instruction rewriting not only includes the foregoing S1 to S4 and the foregoing step 21, but may further include the following steps 22 to 24. An execution time of the step 22 is later than an execution time of the step 21.

Step 22: displaying the response information corresponding to the foregoing debugging request.

It should be noted that the present disclosure does not limit a display manner of the foregoing response information. For example, the response information may be displayed by using an information display interface. The present disclosure does not limit an implementation of the information display interface. For example, the information display interface may include the following four modules shown in ① to ④.

① An initial input information display module, configured to describe an initial state of a current-round debugging, for example, instruction description information entered by a user, an expected debugging result, a debugging instruction generated based on the instruction description information, and the like.

② An operable module, including an automatic repair control and an edit control. The automatic repair control is configured to trigger an instruction automatic repair process, so that a next-round debugging process can be automatically performed based on the foregoing rewritten instruction when the automatic repair control is triggered. The present disclosure does not limit an implementation of the automatic repair control. For example, the automatic repair control may be implemented by using a button. The edit control is configured to provide a text input service for the user when the user does not accept an instruction automatic repair result, so that the user can re-enter new instruction description information by using the edit control. The present disclosure does not limit an implementation of the edit control. For example, the edit control may be implemented by using an input box.

③ A result difference display module, configured to display a difference between the foregoing expected debugging result and the foregoing actual debugging result.

④ A debugging end condition configuration module, configured to provide a configuration service of a debugging end condition for the user, for example, outputting a final result after how many rounds of debugging.

Step 23: in response to receiving an instruction use request, determining the foregoing rewritten instruction as the debugging instruction, and returning to continue to perform the foregoing S2 and subsequent steps.

The instruction use request is used to request to perform a next-round debugging process based on the foregoing rewritten instruction, so that the instruction use request can represent that the user accepts the instruction automatic repair result. The present disclosure does not limit a trigger manner of the instruction use request. For example, the trigger manner may be implemented by using a trigger operation for the foregoing automatic repair control.

It can be learned from the foregoing related content of step 23 that for some application scenarios, after the response information corresponding to the foregoing debugging request is displayed to the user, in response to detecting an instruction use request triggered by the user, it may be determined that the user accepts the instruction automatic repair result. Therefore, the foregoing rewritten instruction may be directly determined as the debugging instruction, and the foregoing S2 and subsequent steps are continued to be performed, to implement a next-round debugging process.

Step 24: in response to receiving an instruction adjustment request, updating the debugging instruction based on instruction adjustment description information carried in the instruction adjustment request, and returning to continue to perform the foregoing S2 and subsequent steps.

The instruction adjustment request is used to request to perform instruction adjustment on the foregoing debugging instruction, so that the instruction adjustment request can represent that the user does not accept the instruction automatic repair result.

In addition, for the foregoing instruction adjustment request, the instruction adjustment description information carried in the instruction adjustment request refers to text information carried in the instruction adjustment request, so that the instruction adjustment description information can describe what adjustment is performed on the foregoing debugging instruction. The present disclosure does not limit an implementation of the instruction adjustment description information. For example, the instruction adjustment description information may include new text content entered by the user through a text box.

In addition, the present disclosure does not limit an implementation of the step "updating the debugging instruction based on the instruction adjustment description information carried in the instruction adjustment request" in the foregoing step 23. For example, the step may be implemented by using any existing or future instruction update method, for example, an instruction update method by using an LLM model. For another example, the step may be implemented by using an instruction generation model shown in FIG. 2. The instruction generation model may be configured to perform instruction update by using an instruction rewriting capability of the instruction rewriting model shown in FIG. 2.

It can be learned from the foregoing related content of step 24 that for some application scenarios, after the response information corresponding to the foregoing debugging request is displayed to the user, in response to detecting an instruction adjustment request triggered by the user, the debugging instruction is updated based on the instruction adjustment description information carried in the instruction adjustment request, and the foregoing S2 and subsequent steps are continued to be performed, so that a next-round debugging process can be implemented, which is beneficial to improving the debugging experience.

It can be learned from the foregoing related content of step 22 to step 24 that in some application scenarios, after the response information corresponding to the foregoing debugging request is displayed to the user, the user can quickly determine an instruction that needs to be used in a next-round debugging process based on the response information, which is beneficial to improving debugging efficiency.

It can be learned from the foregoing related content of the method for instruction rewriting that the technical solution provided in the present disclosure can automatically analyze debugging-related information, for example, information such as a debugging running log and an actual debugging result, so that defects caused by unreadability of the debugging-related information, for example, a long time-consuming for problem analysis and a high analysis cost, can be effectively overcome, thereby improving problem discovery efficiency and reducing an analysis cost, for example, an analysis cost of a debugging error and an analysis cost of an actual debugging result. In addition, the technical solution provided in the present disclosure can automatically rewrite a debugging instruction, so that defects caused by rewriting the debugging instruction manually, for example, a long time-consuming and a high cost, can be effectively overcome, thereby improving debugging efficiency and reducing an instruction rewriting cost. It can be seen that the technical solution provided in the present disclosure can reduce a debugging cost of a task in a data engine and improve debugging efficiency overall.

Figure 3:
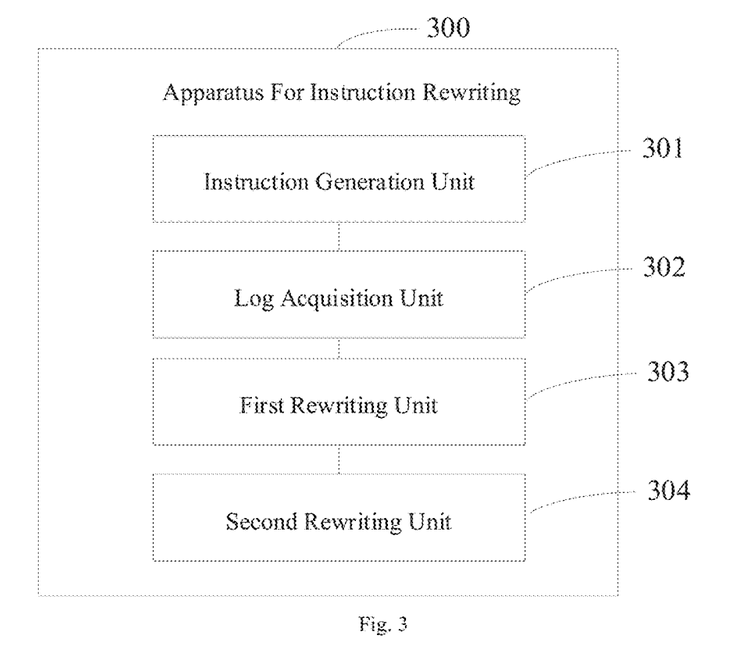
FIG. 3 is a structural schematic diagram of an apparatus for instruction rewriting according to an embodiment of the present disclosure.

Based on the method for instruction rewriting provided in this embodiment of the present disclosure, this embodiment of the present disclosure further provides an apparatus for instruction rewriting. The following describes and explains the apparatus for instruction rewriting with reference to FIG. 3. FIG. 3 is a structural schematic diagram of an apparatus for instruction rewriting according to an embodiment of the present disclosure. It should be noted that for technical details of the apparatus for instruction rewriting provided in this embodiment of the present disclosure, refer to the related content of the method for instruction rewriting described above.

As shown in FIG. 3, an apparatus for instruction rewriting 300 provided in this embodiment of the present disclosure includes:

an instruction generation unit 301, configured to generate a debugging instruction after a debugging request is received, based on instruction description information carried in the debugging request;

a log acquisition unit 302, configured to acquiring a debugging running log corresponding to the debugging instruction, where the debugging running log is obtained by processing the debugging instruction;

a first rewriting unit 303, configured to: in response to the debugging running log indicating a running exception, rewrite the debugging instruction based on exception handling information corresponding to the exception to obtain a rewritten instruction; and a second rewriting unit 304, configured to: in response to the debugging running log indicating that running is normal, rewrite the debugging instruction based on difference description information between an expected debugging result carried in the debugging request and an actual debugging result corresponding to the debugging instruction to obtain a rewritten instruction, where the actual debugging result is obtained by processing the debugging instruction.

In a possible implementation, the rewritten instruction is obtained by rewriting the debugging instruction by using an instruction rewriting model that is pre-constructed.

In a possible implementation, the instruction rewriting model is configured to perform rewriting based on an instruction constraint corresponding to a data engine, a data source constraint corresponding to the data engine, and a rewriting constraint corresponding to the data engine, where the data engine is configured to process the debugging instruction.

In a possible implementation, a process of determining the exception handling information corresponding to the exception includes: in response to the debugging running log indicating the running exception, vectorizing the debugging running log to obtain a debugging log vector; searching for a target exception representation vector from at least one candidate exception representation vector based on the debugging log vector, where a similarity between the target exception representation vector and the debugging log vector is higher than a similarity between any other candidate exception representation vector except the target exception representation vector in the at least one candidate exception representation vector and the debugging log vector; and determining the exception handling information corresponding to the exception based on exception handling information corresponding to the target exception representation vector.

In a possible implementation, the debugging instruction is obtained by performing instruction generation on the instruction description information by using a pre-constructed instruction generation model.

In a possible implementation, the apparatus for instruction rewriting 300 further includes:
- an information generation unit, configured to generate response information corresponding to the debugging request based on the rewritten instruction.

In a possible implementation, the response information includes instruction adjustment prompt information, and the instruction adjustment prompt information is determined based on difference description information between the rewritten instruction and the debugging instruction.

In a possible implementation, in response to the debugging running log indicating that running is normal, the response information is generated based on the rewritten instruction and the actual debugging result.

In a possible implementation, the response information includes the difference description information between the expected debugging result and the actual debugging result.

In a possible implementation, the response information is generated by using a packaging model that is pre-constructed, and the packaging model is configured to perform readability packaging on input data of the packaging model.

In a possible implementation, the apparatus for instruction rewriting 300 further includes:
- an information display unit, configured to display the response information;
- a first updating unit, configured to determine the rewritten instruction as the debugging instruction in response to receiving an instruction use request; and
- a second updating unit, configured to update the debugging instruction based on instruction adjustment description information carried in an instruction adjustment request in response to receiving the instruction adjustment request.

It can be learned from the foregoing related content of the apparatus for instruction rewriting 300 that for the apparatus for instruction rewriting 300 provided in this embodiment of the present disclosure, after receiving a debugging request, a debugging instruction is first generated based on instruction description information carried in the debugging request, so that the debugging instruction meets an instruction requirement described by the instruction description information. Then, a debugging running log corresponding to the debugging instruction is acquired, and the debugging running log is obtained by processing the debugging instruction, so that the debugging running log can describe a state presented when the debugging instruction is processed. In response to the debugging running log indicating a running exception, the debugging instruction is rewritten based on exception handling information corresponding to the exception to obtain a rewritten instruction, so that the exception does not occur when the rewritten instruction is processed. However, in response to the debugging running log indicating that running is normal, the debugging instruction is rewritten based on difference description information between an expected debugging result carried in the debugging request and an actual debugging result corresponding to the debugging instruction to obtain a rewritten instruction, so that a result obtained by processing the rewritten instruction is consistent with the expected debugging result as much as possible. In this way, the instruction can be rewritten automatically, so that defects caused by rewriting the instruction manually, such as a long time-consuming and a large number of rewritings, can be effectively overcome, thereby improving debugging efficiency.

In addition, this embodiment of the present disclosure further provides an electronic device. The device includes at least one processor and at least one memory. The at least one memory is configured to store instructions or computer programs. The at least one processor is configured to execute the instructions or the computer programs in the at least one memory, so that the electronic device executes any implementation of the method for instruction rewriting provided in this embodiment of the present disclosure.

Figure 4:
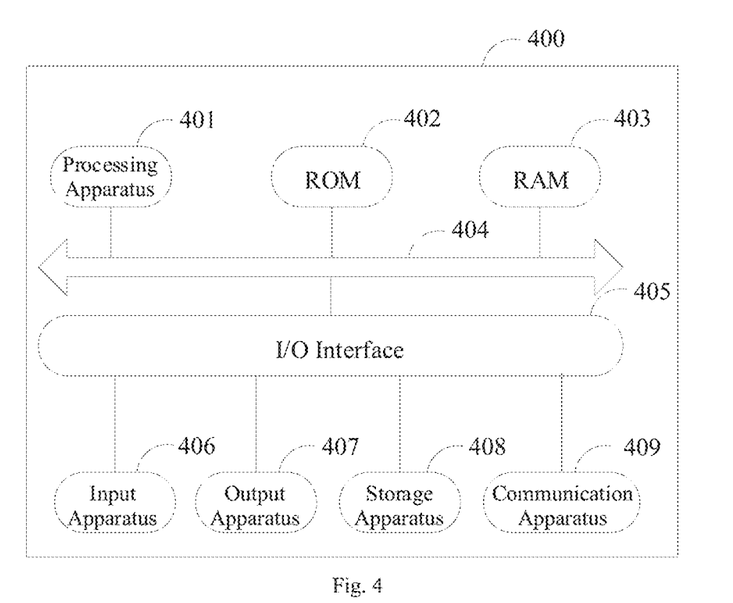
FIG. 4 is a structural schematic diagram of an electronic device according to an embodiment of the present disclosure.

Referring to FIG. 4, FIG. 4 is a structural schematic diagram of an electronic device 400 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (for example, a vehicle navigation terminal), and fixed terminals such as a digital TV and a desktop computer. The electronic device shown in FIG. 4 is merely an example, and shall not impose any limitation on the function and scope of use of the embodiments of the present disclosure.

As shown in FIG. 4, the electronic device 400 may include a processing apparatus (for example, a central processing unit, a graphics processing unit, etc.) 401 that may perform a variety of appropriate actions and processing in accordance with a program stored in a read-only memory (ROM) 402 or a program loaded from a storage apparatus 408 into a random access memory (RAM) 403. The RAM 403 further stores various programs and data required for the operation of the electronic device 400. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 including, for example, a touch screen, a touchpad, a keyboard, a mouse, a camera, a microphone, an accelerometer, a gyroscope, etc.; an output apparatus 407 including, for example, a liquid crystal display (LCD), a speaker, a vibrator, etc.; the storage apparatus 408 including, for example, a tape, a hard disk, etc.; and a communication apparatus 409. The communication apparatus 409 may allow the electronic device 400 to perform wireless or wired communication with other devices to exchange data. Although FIG. 4 shows the electronic device 400 having various apparatuses, it should be understood as an illustration, and more or fewer apparatuses may be implemented or provided instead.

Specifically, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 409 and installed, installed from the storage apparatus 408, or installed from the ROM 402. When the computer program is executed by the processing apparatus 401, the above-mentioned functions defined in the method of the embodiment of the present disclosure are performed.

The electronic device provided in this embodiment of the present disclosure and the method provided in the above embodiment belong to the same inventive concept. For technical details not described in detail in this embodiment, reference may be made to the above embodiment, and this embodiment and the above embodiment have the same beneficial effects.

This embodiment of the present disclosure further provides a non-transitory computer-readable storage medium having instructions or computer programs stored thereon, where when the instructions or the computer programs are run on a device, the device is enabled to perform any implementation of the method for instruction rewriting provided in this embodiment of the present disclosure.

It should be noted that the above-mentioned computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, and the data signal carries computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to electric wires, optical cables, radio frequency (RF), and the like, or any suitable combination thereof.

In some implementations, the client and the server may communicate by using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The foregoing computer-readable medium may be contained in the foregoing electronic device. Alternatively, the computer-readable medium may exist independently, without being assembled into the electronic device.

The foregoing computer-readable medium carries one or more programs, and when the one or more programs are executed by the electronic device, the electronic device can be enabled to perform the foregoing method.

Computer program code for performing operations of the present disclosure may be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case related to the remote computer, the remote computer may be connected to a computer of a user through any type of network, including a local area network (LAN) or a wide area network (WAN), or may be connected to an external computer (for example, connected through the Internet by using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession may actually be executed substantially in parallel, or they may sometimes be executed in a reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The units described in the embodiments of the present disclosure may be implemented by software, or may be implemented by hardware. The name of a unit/a module does not constitute a limitation on the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer magnetic disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

It should be noted that in this specification, the embodiments are described in a progressive manner, and each embodiment focuses on differences from the other embodiments. For the same or similar parts between the embodiments, reference may be made to each other. For a system or apparatus disclosed in the embodiments, since it corresponds to a method disclosed in the embodiments, the description is relatively simple, and for related parts, reference may be made to the description of the method section.

It should be understood that in the present disclosure, "at least one item" means one or more, and "a plurality of" means two or more. "And/or" is used to describe an association relationship between associated objects, and represents that three relationships may exist. For example, "A and/or B" may represent the following cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including a single item (piece) or any combination of a plurality of items (pieces). For example, at least one of a, b, or c may represent: a, b, c, "a and b", "a and c", "b and c", or "a, b, and c", where a, b, and c may be singular or plural.

It should also be noted that in this article, relational terms such as first and second are only used to distinguish one entity or operation from another entity or operation, and do not necessarily require or imply any such actual relationship or order between these entities or operations. Moreover, the term "include/comprise" or any other variant thereof is intended to cover non-exclusive inclusion, so that a process, method, article, or apparatus that includes a series of elements includes not only those elements, but also other elements not explicitly listed, or further includes elements inherent to such a process, method, article, or apparatus. Without more restrictions, an element defined by a sentence "include one . . . " does not exclude the existence of additional identical elements in the process, method, article, or apparatus that includes the element.

The steps of the method or algorithm described in the embodiments disclosed herein may be directly implemented by hardware, a software module executed by a processor, or a combination thereof. The software module may be placed in a random memory (RAM), a memory, a read-only memory (ROM), an electrically programmable ROM, an electrically erasable programmable ROM, a register, a hard disk, a removable disk, a CD-ROM, or any other form of storage medium well known in the art.

The foregoing descriptions of the disclosed embodiments enable those skilled in the art to implement or use the present disclosure. Various modifications to these embodiments will be readily apparent to those skilled in the art, and the general principles defined herein may be implemented in other embodiments without departing from the spirit or scope of the present disclosure. Therefore, the present disclosure is not limited to the embodiments shown herein, but is to comply with the widest scope consistent with the principles and novel features disclosed herein.

The invention claimed is:

1. A method for instruction rewriting, comprising:
after receiving a debugging request, generating a debugging instruction based on instruction description information carried in the debugging request;
acquiring a debugging running log corresponding to the debugging instruction, wherein the debugging running log is obtained by processing the debugging instruction;
in response to the debugging running log indicating a running exception, rewriting the debugging instruction based on exception handling information corresponding to the exception to obtain a rewritten instruction; and
in response to the debugging running log indicating that running is normal, rewriting the debugging instruction based on difference description information between an expected debugging result carried in the debugging request and an actual debugging result corresponding to the debugging instruction to obtain the rewritten instruction, wherein the actual debugging result is obtained by processing the debugging instruction.

2. The method according to claim 1, wherein the rewritten instruction is obtained by rewriting the debugging instruction by using an instruction rewriting model that is pre-constructed.

3. The method according to claim 2, wherein the instruction rewriting model is configured to perform rewriting based on an instruction constraint corresponding to a data engine, a data source constraint corresponding to the data engine, and a rewriting constraint corresponding to the data engine, wherein the data engine is configured to process the debugging instruction.

4. The method according to claim 1, wherein a process of determining the exception handling information corresponding to the exception comprises:
in response to the debugging running log indicating the running exception, vectorizing the debugging running log to obtain a debugging log vector;
searching, based on the debugging log vector, for a target exception representation vector from at least one candidate exception representation vector, wherein a similarity between the target exception representation vector and the debugging log vector is higher than a similarity between any other candidate exception representation vector except the target exception representation vector in the at least one candidate exception representation vector and the debugging log vector; and
determining the exception handling information corresponding to the exception based on exception handling information corresponding to the target exception representation vector.

5. The method according to claim 1, wherein the debugging instruction is obtained by performing instruction generation on the instruction description information by using a pre-constructed instruction generation model.

6. The method according to claim 1, wherein, after obtaining the rewritten instruction, the method further comprises:

generating response information corresponding to the debugging request based on the rewritten instruction.

7. The method according to claim 6, wherein the response information comprises instruction adjustment prompt information, and the instruction adjustment prompt information is determined based on difference description information between the rewritten instruction and the debugging instruction.

8. The method according to claim 6, wherein in response to the debugging running log indicating that running is normal, the response information is generated based on the rewritten instruction and the actual debugging result.

9. The method according to claim 8, wherein the response information comprises difference description information between the expected debugging result and the actual debugging result.

10. The method according to claim 6, wherein the response information is generated by using a packaging model that is pre-constructed, and the packaging model is configured to perform readability packaging on input data of the packaging model.

11. The method according to claim 6, wherein, after the generating response information corresponding to the debugging request, the method further comprises:
displaying the response information;
in response to receiving an instruction use request, determining the rewritten instruction as the debugging instruction; and
in response to receiving an instruction adjustment request, updating the debugging instruction based on instruction adjustment description information carried in the instruction adjustment request.

12. An electronic device, comprising: at least one processor and at least one memory, wherein the at least one memory is configured to store instructions or computer programs; and
the at least one processor is configured to execute the instructions or the computer programs in the at least one memory, to enable the electronic device to perform a method for instruction rewriting, and the method comprises:
after receiving a debugging request, generating a debugging instruction based on instruction description information carried in the debugging request;
acquiring a debugging running log corresponding to the debugging instruction, wherein the debugging running log is obtained by processing the debugging instruction;
in response to the debugging running log indicating a running exception, rewriting the debugging instruction based on exception handling information corresponding to the exception to obtain a rewritten instruction; and
in response to the debugging running log indicating that running is normal, rewriting the debugging instruction based on difference description information between an expected debugging result carried in the debugging request and an actual debugging result corresponding to the debugging instruction to obtain the rewritten instruction, wherein the actual debugging result is obtained by processing the debugging instruction.

13. The electronic device according to claim 12, wherein the rewritten instruction is obtained by rewriting the debugging instruction by using an instruction rewriting model that is pre-constructed.

14. The electronic device according to claim 13, wherein the instruction rewriting model is configured to perform rewriting based on an instruction constraint corresponding to a data engine, a data source constraint corresponding to the data engine, and a rewriting constraint corresponding to the data engine, wherein the data engine is configured to process the debugging instruction.

15. The electronic device according to claim 12, wherein a process of determining the exception handling information corresponding to the exception comprises:
in response to the debugging running log indicating the running exception, vectorizing the debugging running log to obtain a debugging log vector;
searching, based on the debugging log vector, for a target exception representation vector from at least one candidate exception representation vector, wherein a similarity between the target exception representation vector and the debugging log vector is higher than a similarity between any other candidate exception representation vector except the target exception representation vector in the at least one candidate exception representation vector and the debugging log vector; and
determining the exception handling information corresponding to the exception based on exception handling information corresponding to the target exception representation vector.

16. The electronic device according to claim 12, wherein the debugging instruction is obtained by performing instruction generation on the instruction description information by using a pre-constructed instruction generation model.

17. The electronic device according to claim 12, wherein, after obtaining the rewritten instruction, the method further comprises:
generating response information corresponding to the debugging request based on the rewritten instruction.

18. The electronic device according to claim 17, wherein the response information comprises instruction adjustment prompt information, and the instruction adjustment prompt information is determined based on difference description information between the rewritten instruction and the debugging instruction.

19. The electronic device according to claim 17, wherein in response to the debugging running log indicating that running is normal, the response information is generated based on the rewritten instruction and the actual debugging result.

20. A non-transitory computer-readable storage medium, storing instructions or computer programs that, upon running on a device, cause the device to perform a method for instruction rewriting, and the method comprises:
after receiving a debugging request, generating a debugging instruction based on instruction description information carried in the debugging request;
acquiring a debugging running log corresponding to the debugging instruction, wherein the debugging running log is obtained by processing the debugging instruction;
in response to the debugging running log indicating a running exception, rewriting the debugging instruction based on exception handling information corresponding to the exception to obtain a rewritten instruction; and
in response to the debugging running log indicating that running is normal, rewriting the debugging instruction based on difference description information between an expected debugging result carried in the debugging request and an actual debugging result corresponding to the debugging instruction to obtain the rewritten instruction, wherein the actual debugging result is obtained by processing the debugging instruction.

* * * * *